United States Patent
Cao

(10) Patent No.: US 10,348,100 B2
(45) Date of Patent: Jul. 9, 2019

(54) BATTERY BALANCE CIRCUIT AND BATTERY APPARATUS THEREOF

(71) Applicant: Silergy Semiconductor Technology (Hangzhou) LTD, Hangzhou, ZheJiang Province (CN)

(72) Inventor: Hejinsheng Cao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 338 days.

(21) Appl. No.: 15/230,615

(22) Filed: Aug. 8, 2016

(65) Prior Publication Data
US 2017/0110893 A1  Apr. 20, 2017

(30) Foreign Application Priority Data

Oct. 15, 2015  (CN) .......................... 2015 1 0547013

(51) Int. Cl.
*H02J 7/00* (2006.01)
(52) U.S. Cl.
CPC .......... *H02J 7/0016* (2013.01); *H02J 7/0019* (2013.01)
(58) Field of Classification Search
CPC .............................. H02J 7/0016; H02J 7/0019
See application file for complete search history.

(56) References Cited

U.S. PATENT DOCUMENTS

| | | | |
|---|---|---|---|
| 6,075,331 A * | 6/2000 | Ando | H02J 7/345 307/48 |
| 7,081,737 B2 | 7/2006 | Liu et al. | |
| 8,384,245 B2 | 2/2013 | Stauth et al. | |
| 8,390,147 B2 | 3/2013 | Stauth et al. | |
| 8,432,104 B2 | 4/2013 | Hu et al. | |
| 2005/0077875 A1 | 4/2005 | Bohley | |
| 2013/0118817 A1* | 5/2013 | Allaire | B60G 5/02 180/9.5 |
| 2014/0163910 A1 | 6/2014 | Yu et al. | |

(Continued)

FOREIGN PATENT DOCUMENTS

JP  2015065796  * 9/2013

OTHER PUBLICATIONS

Ye Yuanmao, et al., "Zero-current switching switched-capacitor zero-voltage-gap automatic equalization system for series battery string," IEEE Transactions on Power Electronics, Jul. 31, 2012, pp. 3234-3242, vol. 27, No. 7.

*Primary Examiner* — Drew A Dunn
*Assistant Examiner* — Sailesh Thapa
(74) *Attorney, Agent, or Firm* — Michael C. Stephens, Jr.

(57) ABSTRACT

A battery balance circuit configured for a battery apparatus having two batteries coupled in series, can include: first and second capacitors respectively coupled to two terminals of the two batteries; first and second switching circuits respectively coupled to the two terminals of the two batteries, where the first and second switching circuits are configured to control charging or discharging of each of the two batteries; a third capacitor coupled between the first and second switching circuits, where the third capacitor is configured to store or release energy in order to balance battery levels between the two batteries; and parasitic inductors, where the third capacitor and the parasitic inductors are configured to resonate, and the first and second switching circuits are configured to operate at a resonance frequency.

9 Claims, 7 Drawing Sheets

(56) References Cited

U.S. PATENT DOCUMENTS

| | | | |
|---|---|---|---|
| 2015/0340886 A1* | 11/2015 | Sung | H01M 10/441 320/118 |
| 2016/0020621 A1* | 1/2016 | Baby | H02J 7/0016 320/107 |
| 2016/0028256 A1* | 1/2016 | Kubota | H02J 7/0014 320/118 |
| 2016/0233556 A1* | 8/2016 | Nakamura | H01M 12/06 |
| 2016/0233697 A1* | 8/2016 | Ozawa | H02J 7/0016 |

* cited by examiner

BATTERY BALANCE CIRCUIT AND BATTERY APPARATUS THEREOF

RELATED APPLICATIONS

This application claims the benefit of Chinese Patent Application No. 201510547013.5, filed on Oct. 15, 2015, which is incorporated herein by reference in its entirety.

FIELD OF THE INVENTION

The present invention generally relates to the field of power electronics, and more particularly to a battery balance circuit, as may be applied in a portable device.

BACKGROUND

A battery apparatus can include one or more battery packs being coupled in parallel, and each of the battery packs may include a plurality of batteries. Thus, different voltage and/or power requirements of portable computers, medical treatments, test instruments and other industry applications, may be satisfied by different arrangements of the battery apparatus. However, since the capacity of a battery apparatus may be limited to the capacity of a battery that has the lowest capacity among the series-coupled batteries when its capacity does not match the others, the overall capacity of such a battery apparatus may be reduced, which can affect its application.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1A:
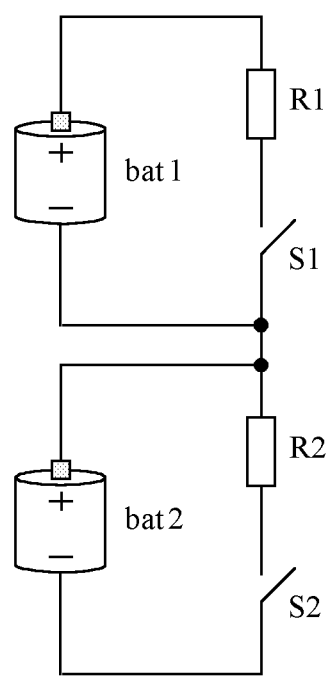
FIG. 1A is a schematic block diagram of a first example battery balance circuit.

Referring now to FIG. 1A, shown is a schematic block diagram of a first example battery balance circuit. In this example, the battery balance circuit may have energy consuming components implemented by resistors. Here, "bat1" and "bat2" are two batteries coupled in series. Also, resistors R1 and R2, and switches S1 and S2 can form a battery balance circuit. For example, if the battery level of battery bat1 is higher than the battery level of battery bat2, battery bat1 should be discharged by turning on switch S1 and turning off switch S2. Then, the energy stored in battery bat1 may be released by resistor R1 in the form of thermal energy, until the battery level of battery bat1 equals the battery level of battery bat2, thus completing the equalization process between the batteries. However, energy utilization may not be optimized in such an equalization process due to energy being dissipated in the form of thermal energy instead of being used by the system.

Figure 1B:
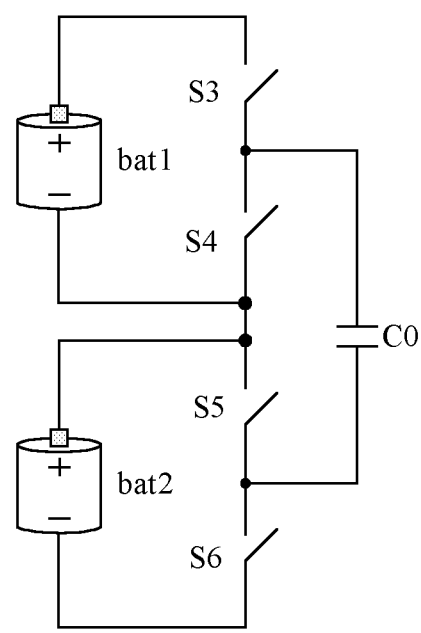
FIG. 1B is a schematic block diagram of a second example battery balance circuit.

Referring now to FIG. 1B, shown is a schematic block diagram of a second example battery balance circuit. This example battery balance circuit can include a capacitor, where bat1 and bat2 are two batteries coupled in series, and switches S3-S6 and capacitor C0 may form a balance circuit. For example, if the battery level of battery bat1 is higher than the battery level of battery bat2, in order to discharge battery bat1, switches S3 and S5 can initially be turned on to connect battery bat1 that has higher battery level with capacitor C0. This can transmit a portion of the energy stored in battery bat1 to capacitor C0, and then switches S3 and S5 may be turned off, followed by switches S4 and S6 being turned on to connect battery bat2 with capacitor C0. This can transmit the energy stored in capacitor C0 to battery bat2, in order to equalize the battery levels between the batteries. However, the balancing current in such a battery balance circuit may be a pulse current, so the balancing ability can be limited by the balancing period and the value of the capacitor, which can possibly result in relatively low efficiency.

In one embodiment, a battery balance circuit configured for a battery apparatus having two batteries coupled in series, can include: (i) first and second capacitors respectively coupled to two terminals of the two batteries; (ii) first and second switching circuits respectively coupled to the two terminals of the two batteries, where the first and second switching circuits are configured to control charging or discharging of each of the two batteries; (iii) a third capacitor coupled between the first and second switching circuits, where the third capacitor is configured to store or release energy in order to balance battery levels between the two batteries; and (iv) parasitic inductors, where the third capacitor and the parasitic inductors are configured to resonate, and the first and second switching circuits are configured to operate at a resonance frequency.

Figure 2:
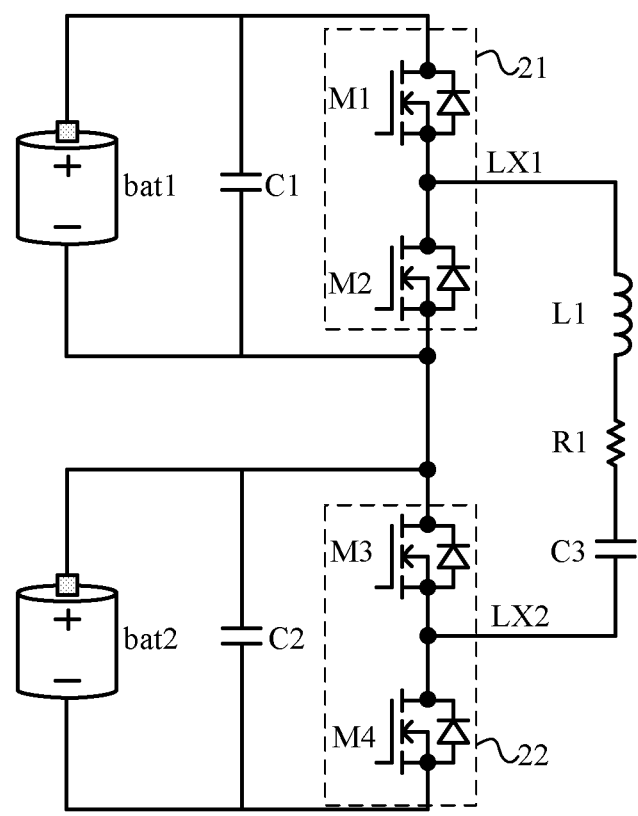
FIG. 2 is a schematic block diagram of an example battery balance circuit, in accordance with embodiments of the present invention.

Referring now to FIG. 2, shown is a schematic block diagram of an example battery balance circuit, in accordance with embodiments of the present invention. In this particular example, the battery balance circuit may include capacitors C1 and C2, switching circuits 21 and 22, and capacitor C3. In certain embodiments, a battery balance circuit can be applied in a battery apparatus that includes at least two series coupled batteries. Also, the battery balance circuit may be configured to balance the battery levels between two series-coupled batteries in the battery apparatus. A battery balance circuit of particular embodiments can be applied to any two series-coupled batteries. In this example, capacitors C1 and C2 may be respectively coupled to two terminals of batteries bat1 and bat2. Capacitors C1 and C2 may have relatively small equivalent series resistance (ESR) and equivalent series inductance (ESL), in order to substantially eliminate the influence on the transmitting current that maybe caused by the parasitic resistance and inductance of the batteries.

Switching circuits 21 and 22 can be respectively coupled to two terminals of batteries bat1 and bat2 for controlling the charge/discharge of the batteries. For example, switching circuit 21 may include transistors M1 and M2 coupled in series, and switching circuit 22 may include transistors M3 and M4 coupled in series. Also for example, all of the transistors can be N-channel enhanced field-effect transistors. Transistor M1 may have a drain electrode coupled to a positive pole of battery bat1, and a source electrode coupled to a drain electrode of transistor M2. Transistor M2 may have a source electrode coupled to a negative pole of battery bat1.

Transistor M3 may have a drain electrode coupled to a positive pole of battery bat2, and a source electrode coupled to the drain electrode of transistor M4. Transistor M4 may also have a source electrode coupled to a negative pole of battery bat2. Capacitor C3 can be coupled between switching circuits 21 and 22 for balancing the battery levels between batteries bat1 and bat2 by storing or releasing energy. For example, capacitor C3 may have a first terminal coupled to a common node of transistors M1 and M2 in switching circuit 21, and a second terminal coupled to a common node of transistors M3 and M4 in switching circuit 22.

Here, inductor L1 may represent a total value of parasitic inductors, such as stray inductors or lead inductors in the circuit. Thus, inductor L1 is an equivalent lumped inductor, and similarly, resistor R1 is also an equivalent lumped resistor. The influence on inductor L1 and resistor R1 caused by the parasitic resistors and inductors of the batteries can substantially be prevented by coupling a capacitor with a relatively small ESR and ESL to each battery in parallel. In one example, resistor R1 may represent the total resistance in the circuit loop from capacitor C3 to capacitor C1 or capacitor C2. That is, resistor R1 can include an on resistance of the transistors, the lead resistances of wires, and equivalent series resistors C3_ESR of capacitor C3. Therefore, capacitor C3 with a relatively small equivalent resistance can be used to increase the transmitting current by decreasing resistor R1.

In one example, capacitor C3 and parasitic inductor L1 in the circuit may resonate during the operation of the battery balance circuit, and switching circuits 21 and 22 can operate at the resonance frequency. The resonance frequency of the same circuit may not be fixed during the operation due to differences in the parasitic inductors, such as stray inductors or lead inductors. Thus, a current zero-crossing detecting circuit may be employed to regulate the resonance frequency. Specifically, the current zero-crossing detecting circuit may be configured to sample a current through capacitor C3, and to switch the switching states of transistors M1 to M4 when the current is crossing zero. This can achieve resonance control and zero voltage and current transition of the transistors, and may reduce switching losses as well as improve the operating efficiency of the overall circuit.

Moreover, the number and cost of components may be minimized due to the resonance of the parasitic inductor and capacitor. Here, the resonance frequency is $f=1/2\pi\sqrt{L1C3}$, the inductor is a parasitic inductor with its value in the range of from several nanohenries (nH) to tens of nanohenries (nH), and if the frequency of the switching circuit is lower than the MHz range, the value of the capacitor can be in the range of several microfarads ($\mu$F) to tens of microfarads ($\mu$F), to facilitate implementation.

Figure 3A:
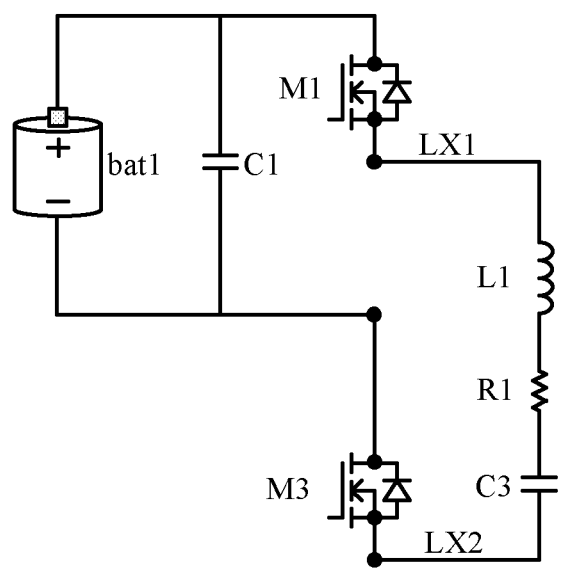
FIG. 3A is an equivalent circuit diagram of an example battery balance circuit in one phase, in accordance with embodiments of the present invention.

Referring now to FIG. 3A, shown is an equivalent circuit diagram of an example battery balance circuit in one phase, in accordance with embodiments of the present invention. In this particular example, during operation of the battery balance circuit, transistors M1 and M3 can be simultaneously turned on or off together, and transistors M2 and M4 can be simultaneously turned on or off together, while transistors M1 and M2 can be turned on complementarily. When transistors M1 and M3 are both turned on, the equivalent diagram of the battery balance circuit during the operation can be shown in FIG. 3A. Here, it can be seen that the loop from battery bat1 to capacitor C3 is conducting in this phase, so capacitor C3 can be used to charge or discharge battery bat1.

Figure 3B:
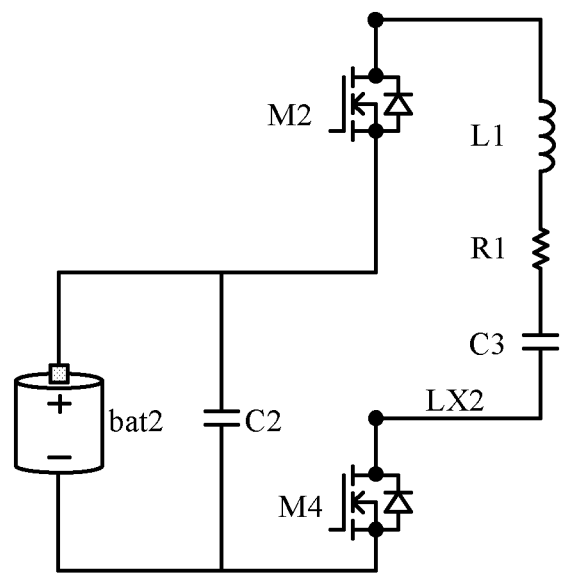
FIG. 3B is an equivalent circuit diagram of an example battery balance circuit in another phase, in accordance with embodiments of the present invention.

Referring now to FIG. 3B, shown is an equivalent circuit diagram of an example battery balance circuit in another phase, in accordance with embodiments of the present invention. When transistors M2 and M4 are both turned on, the equivalent diagram of the battery balance circuit during operation can be as shown in FIG. 3B. Here, it can be seen that the loop from battery bat2 to capacitor C3 is conducting in this phase, so capacitor C3 can be used to charge or discharge battery bat2. In this way, the battery levels of two batteries can be balanced.

In addition, the connections of the transistors can be arranged so as to avoid one battery from being misconducted due to the body diode of the transistors when the other battery is connected to capacitor C3. Referring back to FIG. 3A, it can be seen that battery bat1 may not be connected to capacitor C3 by the body diode when transistors M1 and M3 are both off. However, when positions of the drain electrode and the source electrode of transistor M1 are switched, battery bat1 may be connected to capacitor C3 through the body diodes of transistors M1 and M3 when the voltage of battery bat1 is higher than the voltage across capacitor C3.

Thus, the circuit may be incorrectly turned on, and the battery balance circuit may not operate in support of correct balance action. In certain embodiments, the correct operation of the circuit can be guaranteed to avoid such misconduction by keeping the connection of transistors in each switching circuit consistent, and by setting the cathode of the body diode of the upper transistor (e.g., transistors M1 or M3) to be coupled with the positive pole of battery bat1, and the anode of the body diode of the lower transistor (e.g., transistors M2 or M4) to be coupled with the negative pole of battery bat2 in each switching circuit.

Figure 4:
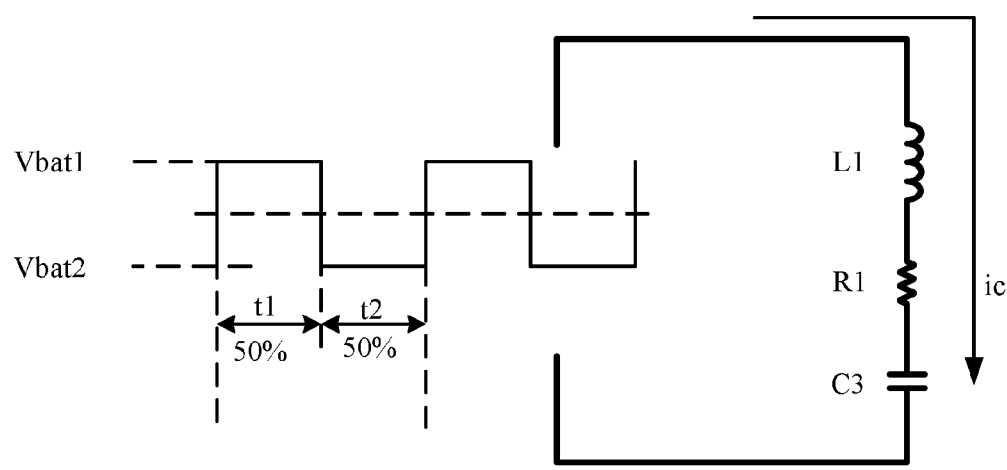
FIG. 4 is an equivalent circuit diagram of an example of analyzing a battery balance circuit, in accordance with embodiments of the present invention.

Referring now to FIG. 4, shown is an equivalent circuit diagram of an example of analyzing a battery balance circuit, in accordance with embodiments of the present invention. In this particular example, suppose the battery level of battery bat1 is higher than the battery level of battery bat2 (e.g., the voltage of battery bat1 is higher than the voltage of battery bat2), such that the energy stored in battery bat1 should be transmitted to battery bat2. When transistors M1 and M3 are both turned on, the redundant energy of battery bat1 may be stored in capacitor C3 (e.g., the energy in battery bat1 is transmitted to capacitor C3). When transistors M2 and M4 are both turned on, capacitor C3 may charge battery bat2, thus the redundant energy of battery bat1 can be transmitted to battery bat2. In this way, the battery levels of the two batteries can be balanced.

If the time period of the first phase equals the time period of the second phase (e.g., t1=t2 in FIG. 4), the equivalent diagram of the battery balance circuit can be obtained as shown on the right side of FIG. 4. This equivalent circuit can be formed by looking into the circuit from two terminals LX1 and LX2. For example, the two batteries may be equivalent to a square signal with a duty cycle of about 50%, and a magnitude value that equals a voltage difference between the batteries.

Figure 5:
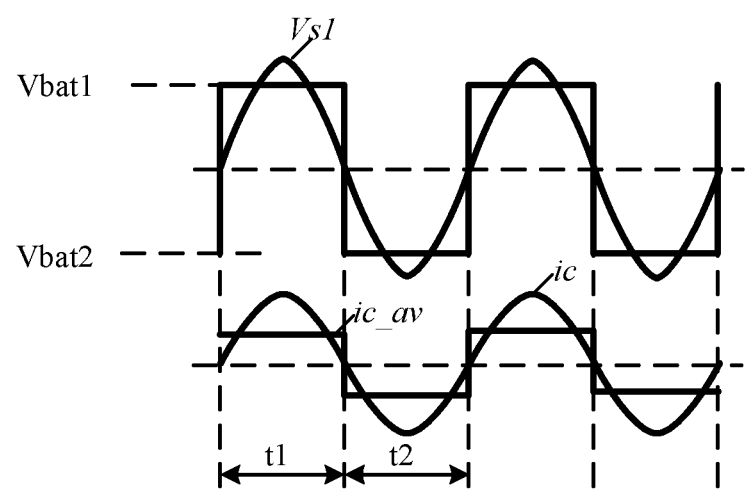
FIG. 5 is a waveform diagram of example operation of a battery balance circuit, in accordance with embodiments of the present invention.

Referring now to FIG. 5, shown is a waveform diagram of example operation of a battery balance circuit, in accordance with embodiments of the present invention. Viewed in conjunction with the equivalent diagram of FIG. 4, it can be seen that the series resonance may cancel out the impedance of capacitor C3 and parasitic inductor L1 during the resonance process. Thus, the transmitting current can be shown as below in Equation (1):

$$ic = Vs1/(j\omega L + 1/j\omega C3 + R1) = Vs1/R1 \qquad (1)$$

Vs1 here represents the fundamental wave of the voltage difference between the two batteries bat1 and bat2. In FIG. 5, ic_av is an average value of the transmitting current, and ic_av may have two different values in the positive half cycle versus the negative half cycle. From Equation (1), the transmitting current is related to the battery voltage difference and the impedance of the circuit loop, regardless of the value of the capacitors and switching frequency. As such, the impedance of the circuit loop can be reduced, and the transmitting current can be increased by coupling capacitors with an equivalent series resistor and equivalent series inductor of relatively small values to the batteries in parallel, and by employing a capacitor with a relatively small equivalent series resistance as a resonant capacitor (e.g., capacitor C3).

In particular embodiments, a battery balance circuit of a resonance type can include a capacitor and a parasitic inductor, and may transmit energy by using the voltage difference between the batteries to the maximum extent. This can achieve zero current transition of the switching circuits by controlling the resonance current, and the transmitting current may not be substantially affected by the frequency and the capacitors. In this way, the transmitting current can be increased in order to obtain higher operating efficiency.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A battery balance circuit configured for a battery apparatus having two batteries coupled in series, the battery balance circuit comprising:
a) first and second capacitors respectively coupled to two terminals of said two batteries;
b) first and second switching circuits respectively coupled to said two terminals of said two batteries, wherein said first and second switching circuits are configured to control charging or discharging of each of said two batteries;
c) a third capacitor coupled between said first and second switching circuits, wherein said third capacitor is configured to store or release energy in order to balance battery levels between said two batteries;
d) parasitic inductors, wherein said third capacitor and said parasitic inductors are configured to resonate, and said first and second switching circuits are configured to operate at a resonance frequency; and
e) a current zero-crossing detecting circuit configured to sample a current through said third capacitor, and to change switching states of transistors in said first and second switching circuits when said sampled current crosses zero.

2. The battery balance circuit of claim 1, wherein:
a) an equivalent resistance of said first and second capacitors is less than a parasitic resistance of said two batteries; and
b) an equivalent inductance is less than a parasitic inductance of said two batteries such that effects on a transmitting current caused by said parasitic resistance and said parasitic inductance of said two batteries is substantially eliminated.

3. The battery balance circuit of claim 1, wherein said first switching circuit comprises first and second transistors, and said second switching circuit comprises third and fourth transistors.

4. The battery balance circuit of claim 1, wherein when one of said two batteries is connected to said third capacitor, the other of said two batteries is not connected to said third capacitor through a body diode of a transistor.

5. The battery balance circuit of claim 3, wherein said third capacitor comprises a first terminal coupled to a common node of said first and second transistors, and a second terminal coupled to a common node of said third and fourth transistors.

6. The battery balance circuit of claim 5, wherein:
a) said first and third transistors are simultaneously turned on or off, and said third capacitor charges or discharges one of said two batteries during a time period when said first and third transistors are both turned on;
b) said second and fourth transistors are simultaneously turned on or off, and said third capacitor charges or discharges the other of said two batteries during a time period when said second and fourth transistors are both turned on; and
c) said first and second transistors are complementarily turned on.

7. The battery balance circuit of claim 6, wherein when said current zero-crossing detecting circuit determines that said current through said third capacitor is crossing zero, said first and third transistors are switched to an off state from an on state, and said second and fourth transistors are switched to an on state from an off state, or said first and third transistors are switched to an on state from an off state, and said second and fourth transistor are switched to an off state from an on state.

8. A battery apparatus, comprising:
a) a plurality of batteries; and
b) the battery balance circuit of claim 1, configured to balance voltage levels among said plurality of batteries.

9. The battery apparatus of claim 8, configured as a portable device.

* * * * *